United States Patent
Frenkel et al.

(10) Patent No.: US 11,841,932 B2
(45) Date of Patent: Dec. 12, 2023

(54) SYSTEM AND METHOD FOR UPDATING BIOMETRIC EVALUATION SYSTEMS

(71) Applicant: Nice Ltd., Ra'anana (IL)

(72) Inventors: Roman Frenkel, Ashdod (IL); Matan Keret, Oulu (IL); Amit Sharon, Hod-Hasharon (IL)

(73) Assignee: Nice Ltd., Ra'anana (IL)

( * ) Notice: Subject to any disclaimer, the term of this patent is extended or adjusted under 35 U.S.C. 154(b) by 507 days.

(21) Appl. No.: 16/847,919

(22) Filed: Apr. 14, 2020

(65) Prior Publication Data
US 2021/0319085 A1    Oct. 14, 2021

(51) Int. Cl.
G06F 21/32    (2013.01)
G06F 16/68    (2019.01)
G06F 16/23    (2019.01)

(52) U.S. Cl.
CPC .......... *G06F 21/32* (2013.01); *G06F 16/2379* (2019.01); *G06F 16/68* (2019.01)

(58) Field of Classification Search
CPC .............................. G06F 21/32; G06F 16/2379
See application file for complete search history.

(56) References Cited

U.S. PATENT DOCUMENTS

| | | | |
|---|---|---|---|
| 6,519,561 B1* | 2/2003 | Farrell | G10L 17/04 704/250 |
| 2016/0093129 A1* | 3/2016 | Jelavic | G06F 21/32 340/5.52 |
| 2019/0324719 A1* | 10/2019 | Vaquero Avilés-Casco | G06F 3/167 |
| 2020/0184278 A1* | 6/2020 | Zadeh | G06N 3/044 |

* cited by examiner

*Primary Examiner* — Amal S Zenati
(74) *Attorney, Agent, or Firm* — PEARL COHEN ZEDEK LATZER BARATZ LLP

(57) ABSTRACT

A system and method may adjust the threshold or other settings in a biometric comparison system, or provide a report or display of parameters. Over a series of comparisons of authentication biometric samples (e.g. authentication VPs) to enrollment biometric samples (e.g. enrollment VPs), the authentication samples may be stored, and scores resulting from the biometric comparisons may be stored in a first set of scores. A second set of biometric comparisons may be created, each using a pairing of a stored authentication biometric sample and an enrollment biometric sample, each biometric comparison resulting in a score, the scores forming a second set of scores. The first and second sets of scores may be combined to produce a third set of scores, and an iterative process may be performed over the third set of scores to update the parameters of the Gaussian distribution of the third set of scores.

18 Claims, 7 Drawing Sheets

SYSTEM AND METHOD FOR UPDATING BIOMETRIC EVALUATION SYSTEMS

FIELD OF THE INVENTION

The present invention relates generally to biometric evaluation systems such as voice authentication systems, and more specifically updating or tuning such systems.

BACKGROUND OF THE INVENTION

Computer systems exist to use biometric information to authenticate people—to prove to some extent that a person's presented or purported identification valid and that person is in fact that person. For example, RTA (Real Time Authentication), PFE (Proactive Fraudster Exposure) and RTFP (Real Time Fraud Prevention) systems may use biometric information of a user to determine if that user is who they say they are. Often the biometric information is a user's voice, e.g. the sound information of a user speaking over telephone or other voice communication channel. Such a sample of a user's voice may be converted to data uniquely identifying the voice of the user, called a voiceprint (VP).

A VP may be a derivation of a person's audio speech which may be used to uniquely identify the person and distinguish the person from other people. For example, a voiceprint may be a spectrogram, or a vector or feature vector of, for example, 400 numbers. A VP may be a spectrogram or acoustic frequency spectrum of a voice, typically stored in digital form. A VP may be text independent (e.g. based on a given normal conversation, and thus not spoken text where the words are predicted), or text dependent (e.g. a set of words or a phrase provided to a person for the person to repeat, which may be the same across all people enrolled in the system). Enrollment in biometric systems captures a standard biometric sample (e.g. VP or other sample) from a person whose identity is known (e.g. the person is authenticated), for use in future authentication. For example, an enrollment VP may be captured from a user of a system and then in each future session an authentication VP may be captured and compared against the enrollment VP to authenticate the user.

A biometric score, rating or output may be generated by for example comparing a VP created from a user's current speech (e.g. the user speaking to a customer service agent, e.g. an authentication VP) to a stored VP (e.g. enrollment VP), where the higher the score the more likely it is that the user's biometric information (here, VPs) match, and thus the more likely it is that the person is who they say they are. One method of authentication uses i-vectors ("intermediate vectors"; e.g. vectors representing features of the biometric sample using dimensionality reduction), which may convey speaker characteristics among other information such as the transmission channel acoustic environment. Other authentication methods include using neural networks (NNs), the use of x-vectors and d-vectors (e.g. vectors taken from an internal NN representation).

One example range of such a biometric score is −50 to 50; other ranges may be used. One common method of comparing an authentication biometric sample (e.g. a VP captured from a user when calling a call center) to an enrollment biometric sample (a previously captured sample, captured for enrollment) is to input the biometric samples to a machine learning model such as a NN which has been trained. After training, there may be a limited tuning period, after which the model and thresholds are set. A threshold may define a point, where if the score resulting from a biometric comparison system (e.g. a machine learning model) is above the threshold, the user is authenticated, and if the score is less than or below a threshold, the user is not authenticated. Such a threshold may be the same for all callers in a certain system, such as a call center for an organization handling customer service calls for users in the organization.

Such a threshold may need to be changed for a specific system or set of users over time, for example if telephony systems used by the customers or the entity (e.g. call center) handling the telephone calls have changed, or codecs have changed (a codec is a device or process encoding or decoding digital data streams or signals, the modification of which may affect data input to biometric comparison systems). Such changes may cause changes in false negatives and/or false positives, and loss of accuracy in the biometric comparison systems or models.

Recalibration of such systems, e.g. altering the thresholds, may be manual, which is time and resource consuming. Further, such manual and need-based corrections may not result in actual improvement in accuracy in an efficient manner.

SUMMARY OF THE INVENTION

A system and method may adjust the threshold or other settings in a biometric comparison system, or provide a report or display of parameters or settings of the system. Over a series of biometric comparisons of authentication biometric samples (e.g. authentication VPs) to enrollment biometric samples (e.g. enrollment VPs), the authentication biometric samples may be collected or stored, and scores resulting from the biometric comparisons may be stored in a first set of scores. A second set of biometric comparisons may be created, each based on a pairing of a stored authentication biometric sample and an enrollment biometric sample, each biometric comparison resulting in a score, the scores forming a second set of scores. The first set of scores may be combined with the second set of scores to produce a third set of scores, and an iterative process may be performed over the third set of scores to update the parameters of the Gaussian distribution of the third set of scores.

Automatic biometric tuning may be performed, using distribution modeling. Embodiments may create relevant data used for tuning, modeling it and delivering insights. Prior art processes of biometric analysis may save "genuine" scores, those resulting from mostly authentic people (e.g. people who are who they say they are), for example for reporting or monitoring purposes, or investigating suspicious activity, and thus saved scores may be heavily skewed to be those above an authentication threshold, such as the score distribution shown in FIG. 2C. In the histogram in FIG. 2C, the X axis represents the score for a bin, and the Y axis represents the number of samples for a certain bin. If the data, such as the data depicted in FIG. 2C, lacks enough "imposter" scores—resulting from a comparison of authentication biometric samples to enrollment samples not from the same person as the authentication samples—it is difficult to tell how accurate the biometric analysis is or properly calibrate the system. Typically, imposter scores are created when a person deliberately pretends to be someone they or not. If it is considered that the data in FIG. 2C represents call center authentication scores, most of the scores are from genuine calls, making it difficult to accurately measure a false reject rate (FRR) and false accept rate (FAR), and to estimate the Gaussian distribution.

Embodiments of the invention may improve the accuracy and resiliency of biometrics engines, such as voice biometrics engines and/or biometrics systems using machine learning. Adjusting parameters of biometric technology may be difficult to performed by a human, as a human may perform such calibration infrequently, and may perform such calibration experimentally, by simply viewing output or biometric results after reviewing system performance. An automatic calibration system such as with some embodiments of the present invention may allow for automatic calibration, for example periodically, with results that are much more accurate than if performed manually be a human.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
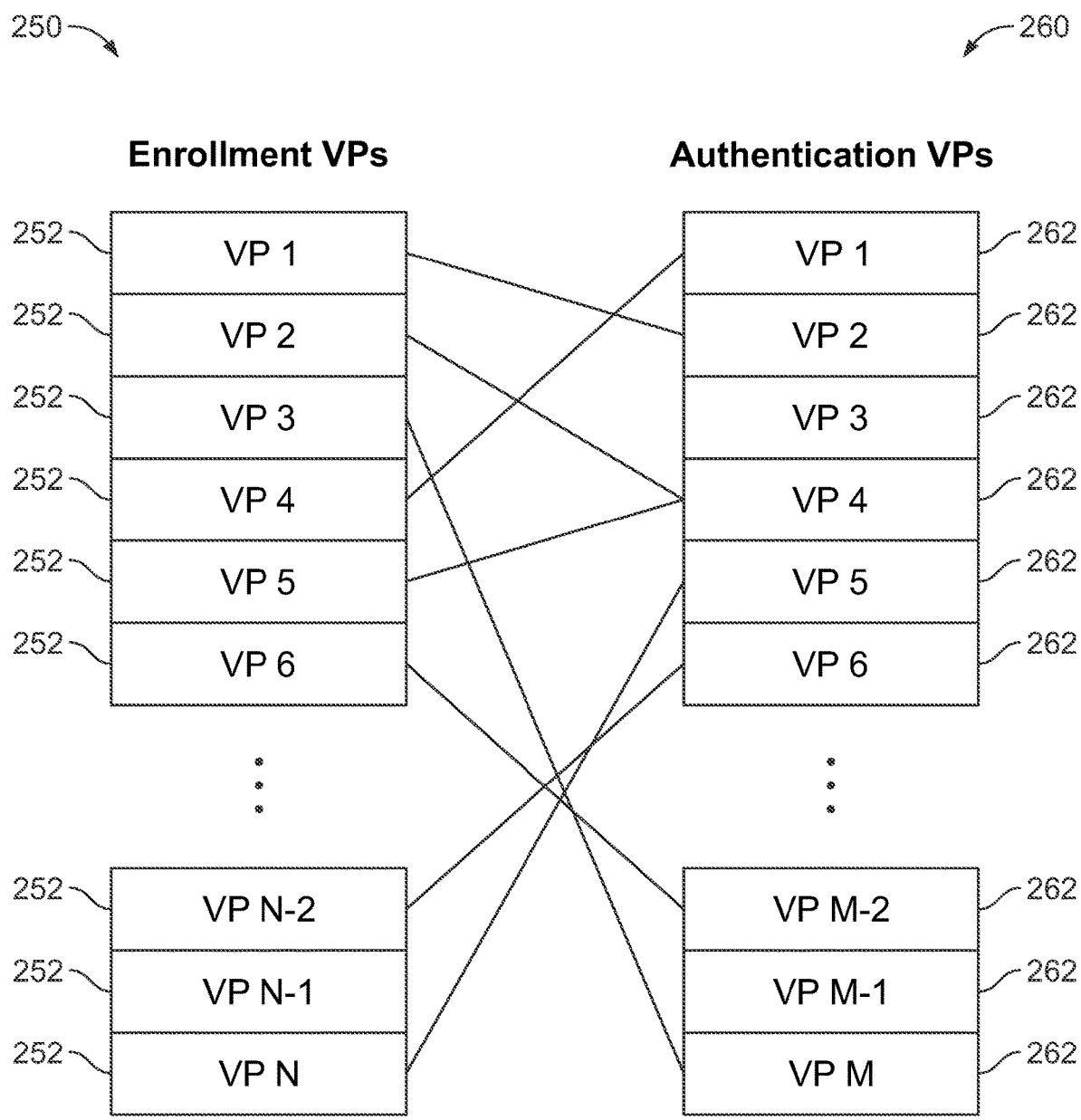
FIG. 1 depicts a random pairing between a set of enrollment biometric samples and a set authentication biometric samples, according to one embodiment of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may automatically adjust biometric thresholds in a biometric comparison system (e.g. performing authentication), and/or perform analysis of biometric comparison systems performance. One embodiment may use a multi-stage process. In a first stage, over a series of biometric comparisons (for example, during or in parallel with a genuine authentication processes which may include comparisons of authentication voice prints to enrollment voice prints), the authentication biometric samples that are provided by the person being authenticated (e.g. voice prints) may be kept, collected or stored, and scores, ratings or output resulting from the biometric comparisons in a first set of scores may be kept or stored. In some embodiments, all data from the first stage is stored: e.g. each of the stored biometric voice prints used for the biometric comparisons results in score being stored, resulting from the biometric comparisons, in the first set of scores. In other embodiments, only some data from the first stage is stored: e.g. not all biometric voice prints used for authentication or comparisons are stored, and/or not all such scores are stored.

In some embodiments, the authentication samples (e.g. VPs) may be stored in a table, repository or database separate from enrollment samples. Such samples may be captured over a time window of for example one week or another period, and/or until enough such samples are collected, at which time a second stage may take place. For example, it may be desirable to have at least 10,000 samples in each of the first and second set of scores discussed with respect to the second stage.

In the second stage, a second set of biometric comparisons may be created, e.g. outside of the normal authentication process, each comparison based on a pairing (e.g. a random matching) of a stored authentication voice print (e.g. one kept from the first process) and an enrollment biometric voice print (typically kept for use during authentication), each biometric comparison resulting in a score, rating or output where these scores form a second set of scores. In some embodiments, the number of scores in the second set of scores is substantially equal to the number of scores in the first set of scores. Such a randomization process produces pairings of authentication biometric signatures with enrollment signatures where typically the signatures have been generated from different people, thus generating a score most likely indicative of a mismatch or imposter (some pairings may create high (over the threshold) non-imposter scores, e.g. if the pairing results in an authentication signature and enrollment signature being from the same person, or due to the comparison process).

The first and second sets of scores may be combined to form or produce a third set of scores, and a new threshold, or other analysis, may be created on this combined set of scores. In some embodiments, it may be considered that the first set of scores describes largely comparisons of genuine (where the person is who they say they are, e.g. the claimed speaker is the same one as the "enrollee") biometric comparisons, and thus an analysis of such a set may be missing "imposter" comparisons (where the person is not who they say they are). Adding the second set of scores may improve analysis of such systems by adding such "imposter" data, where the biometric samples do not match as well as with the genuine comparisons.

An iterative process may be performed over the combined, third set of scores to update the parameters of the Gaussian distribution of the third set of scores (e.g. a weight, mean and/or standard deviation or variance (standard deviation and variance being related by the power of two, and thus one of the two may be used with suitable adjustments), and/or other parameters), for example, to adjust an authentication threshold. It may be considered that the third set of scores this is modeled by two Gaussian distributions, or that it is normally distributed by a mixture of two gaussian distributions. For example, an authentication threshold may be created or adjusted (possibly automatically, by a processor) based on the updated parameters of the Gaussian distribution of the third set of scores. Such an iterative process may be an expectation-maximization algorithm.

The updated threshold or parameters may be used to perform future authentications in an improved manner. For example, an authentication may be performed using a threshold based on the updated parameters of the Gaussian distribution.

In the first stage, authentication biometric samples (e.g. VPs) which are created or derived from user input during user authentication processes may be collected and stored: such samples are typically not saved. For example, prior systems may derive a VP from a user's speech during the initial moments of a telephone call, use this authentication VP for authentication by comparing it with a stored enrollment VP, and then discard the VP. Embodiments of the present invention may instead keep the VP, and may collect and store a set or table of authentication VPs from a number of different users over time.

A process may analyze the biometric comparison system's performance, provide a report, or update biometric comparison system parameters such as thresholds. A second stage may occur for example periodically and/or when a minimum number of authentication VPs are collected, or based on another trigger. In the second stage, the table or set of enrollment VPs may be loaded, and pairs of authentication VPs and enrollment VPs may be randomly chosen. FIG. 1 depicts a random pairing between a set 250 of N enrollment biometric samples 252 such as VPs and a set 260 of M authentication biometric samples 262 such as VPs, according to one embodiment of the present invention.

Based on this random pairing, imposter scores may be generated which, since they are comparing two VPs which are most likely from different people, likely cause the biometric comparison system to generate a comparison score indicating a non-authenticated user, e.g. an impostor, where the user is not who they purport to be. This pairing and comparison may be repeated or iterated many times.

In the second stage, an analysis may be performed on the collection of pre-existing enrollment scores (typically, the majority of which result from genuine positive authentications, with scores above the threshold) and newly-generated impostor scores (typically the majority of which lie below the threshold). The genuine enrollment scores and imposter scores may be merged into one data set, and an algorithm such as the expectation-maximization (EM) algorithm may process the combined scores using a Gaussian Mixture Model (GMM, a probabilistic model for representing the presence of subpopulations within an overall population) to find parameters, in order to fit the two Gaussian distributions on a given distribution. The process may proceed iteratively, each time producing a new threshold.

An EM algorithm may include an iterative method to find estimates of parameters in the combined Gaussian distribution, and may alternate between performing an expectation (E) step, which creates a function for the expectation of the log-likelihood evaluated using the current estimate for the parameters, and a maximization (M) step, which computes parameters maximizing the expected log-likelihood found on the E step. These parameter-estimates are then used in the next E step.

The first and second stages may periodically repeat, e.g. automatically or as needed.

Figure 2B:
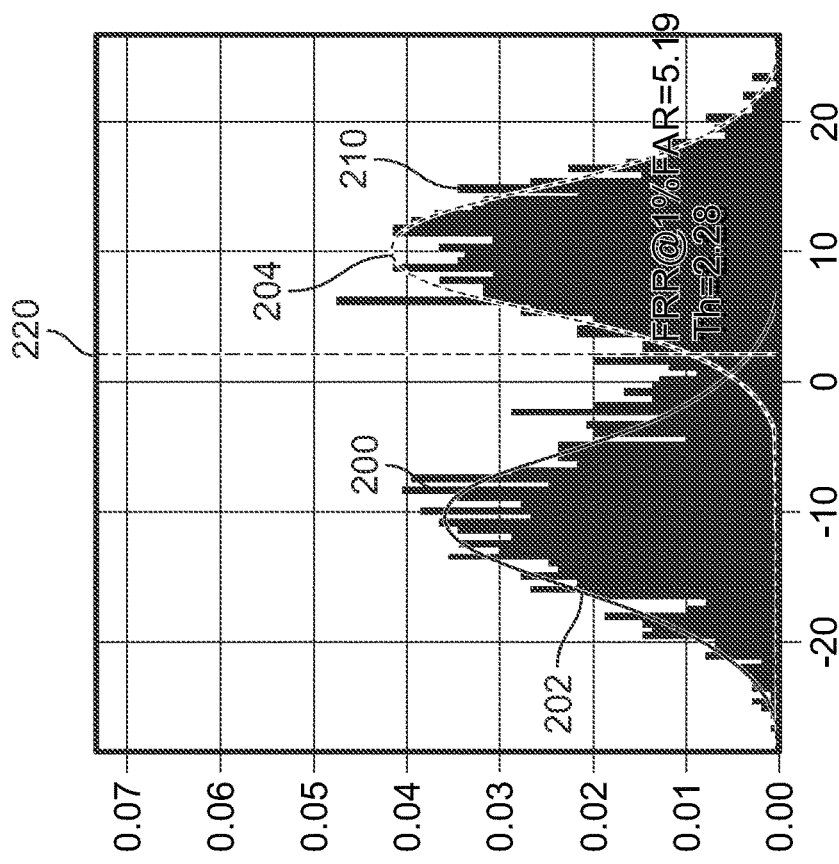
FIG. 2A and FIG. 2B depict two data sets before (FIG. 2A) and after (FIG. 2B) data analysis.
Figure 2A:
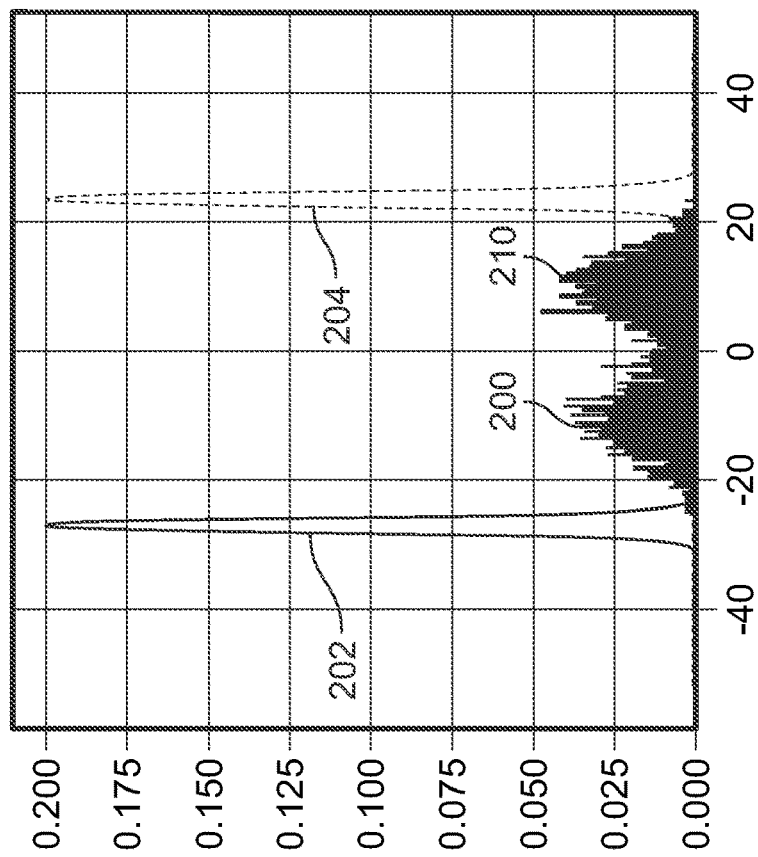

FIGS. 2A and 2B depict two Gaussian distributions combined, according to one embodiment. FIG. 2A depicts two data sets 200 and 210 combined before analysis is performed, and FIG. 2B depicts the two data sets 200 and 210 combined after a many iterations of data analysis are performed (typically many iterations are performed for a more accurate fit). In each of FIGS. 2A and 2B data sets 200 and 210 are the same, but the scale differs from FIG. 2A to FIG. 2B, and thus the data sets 200 and 210 appear smaller in FIG. 2A. In FIGS. 2A and 2B the X axis represents the score rating or output resulting from a comparison entered as data (typically either an actual or "genuine" authentication comparison, or an artificial comparison of most likely not corresponding biometric samples), and the Y axis represents a normalized representation (e.g., normalized to be between 0 and 1) number of samples corresponding to a bucket or bin for a certain score (in one embodiment the number of biometric comparisons).

Data set 200 is a result of the input of random pairings of enrollment biometric information with biometric information intentionally designed to not match the enrollment biometric information (e.g. a pairing of an enrollment VP with a random authentication VP) and the data set of Gaussian distribution 210 includes scores or outputs of genuine authentications. Data set 210 may be produced from a comparison of stored enrollment biometric samples to authentication biometric samples (created at the time of authentication of a person claiming to have an identity corresponding to the enrollment biometric sample), e.g. using a biometric engine. Data sets 200 and 210 together form a combined data set which includes many discrete data points, each for example a score resulting from genuine (e.g. authentication) or "impostor" (e.g. random pairing) biometric comparison.

In FIG. 2A, two Gaussian distributions 202 and 204 may be initialized, each with or defined by initialized parameters. In FIG. 2A, the horizontal lines represent the data as a histogram of the data (e.g. a score histogram, or data distribution as well), while the curved lines over the data represent the Gaussian distribution modeled on the data. Example initialized parameters may include 0.5 for the weight, 1.0 for the variance, and a mean, with the means for distributions 202 and 204 being initialized to be, respectively, the minimum and maximum of the scores in the distribution in FIG. 2A. Other initialized values may be used, and other parameters may be initialized. An iterative process may alter Gaussian distributions 202 and 204 in FIG. 2A to match or fit to data sets 200 and 210, and thus to be transformed to be Gaussian distributions 202 and 204 in FIG. 2B. Based on the altered or updated FIG. 2B Gaussian distributions 202 and 204, a new threshold may be created. In FIG. 2B it can be seen that a new threshold 220 has been produced based on the two Gaussian distributions.

Threshold 220 may be for example based on an FRR and/or FAR. For example, given a 1% FAR and 5.19% FRR, the Gaussian distribution in FIG. 2B may suggest or result in a threshold of 2.28 as seen in the graph in FIG. 2B. Threshold 220 may be the score above which a biometric comparison is deemed authenticated and below which the comparison is deemed not authenticated, with a score equal to the threshold authenticated or per the system designer. The output of biometric comparisons made by a comparison system (e.g. an authentication system) may change over time due to for example telephony changes, codec changes, etc., and thus readjustment to the threshold or other settings may be needed. An example threshold may be chosen at a point with 1% false success (users who were successfully authenticated but who are imposters) and 1% false rejection (users who were not successfully authenticated but who are who they purport to be). The threshold line does not need to be at the low point between the two distributions 202 and 204, but is typically near this low point.

Threshold 220 is typically used by an authentication process: biometric matches at or above threshold 220 are deemed to be successful authentications, and biometric matches below threshold 220 are deemed to be not successful authentications. (In other embodiments, occurrences of values equal to the threshold can be deemed to be unsuccessful authentications, and the use of the threshold can be "at or below threshold" for unsuccessful authentications.)

Adjusting the threshold may for example improve authentication technology accuracy. Embodiments may create imposter scores based on existing (e.g. enrollment VPs collected in the past) and new voice prints (e.g. authentication VPs collected more recently, possibly after system changes reduced accuracy). Such an improved imposter score creation system may allow for improved data analysis. Further, a model may be fitted or adjusted based on these scores. After such a model is created a user may understand how accurate a biometric system is and detect if errors exist. A biometric system may be adjusted in an autonomous and automatic manner. Embodiments may prevent or decrease inaccurate biometric detection.

Figure 3:
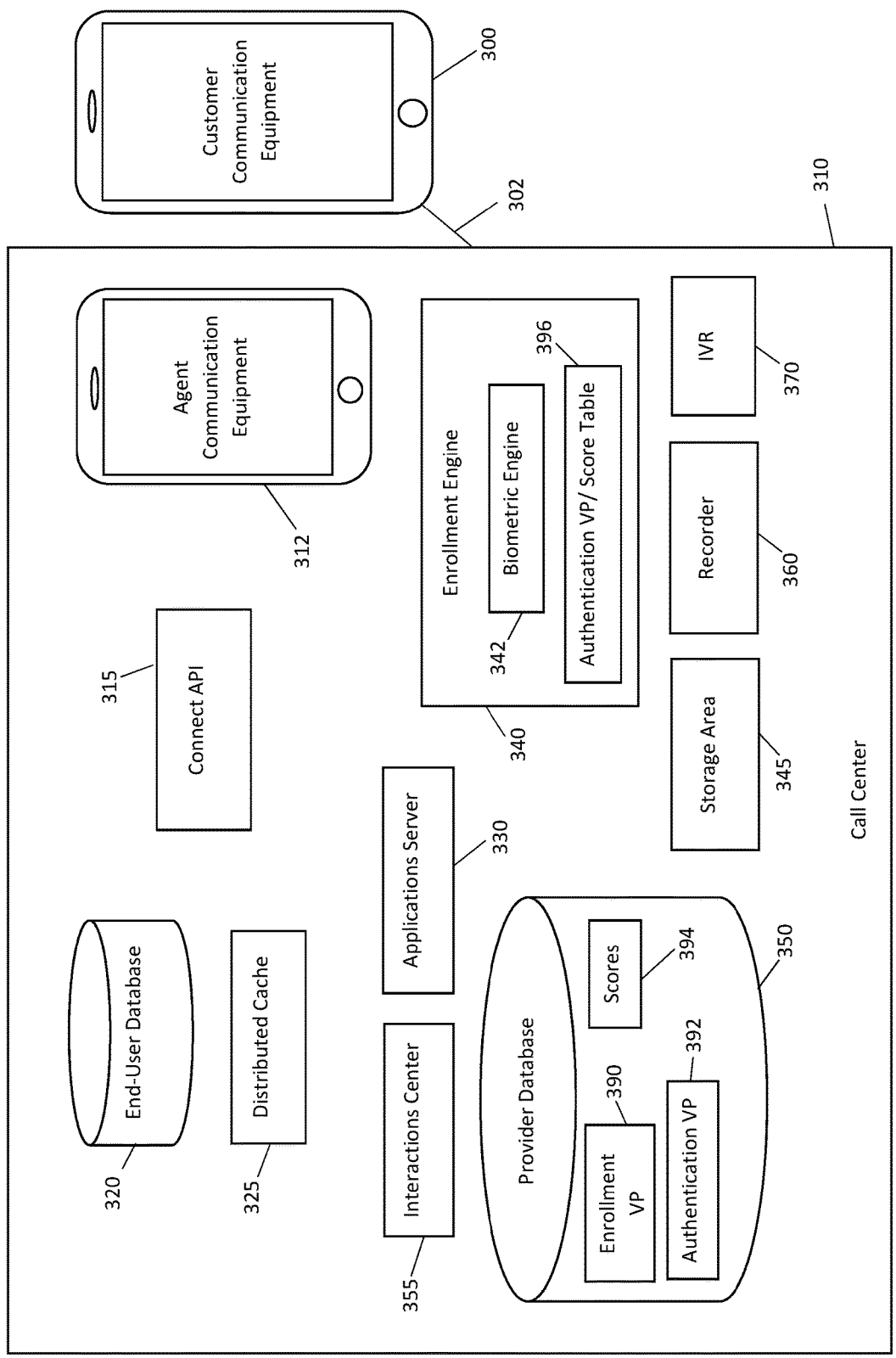
FIG. 3 depicts a system including a biometric comparison system according to embodiments of the present invention.
Figure 6:
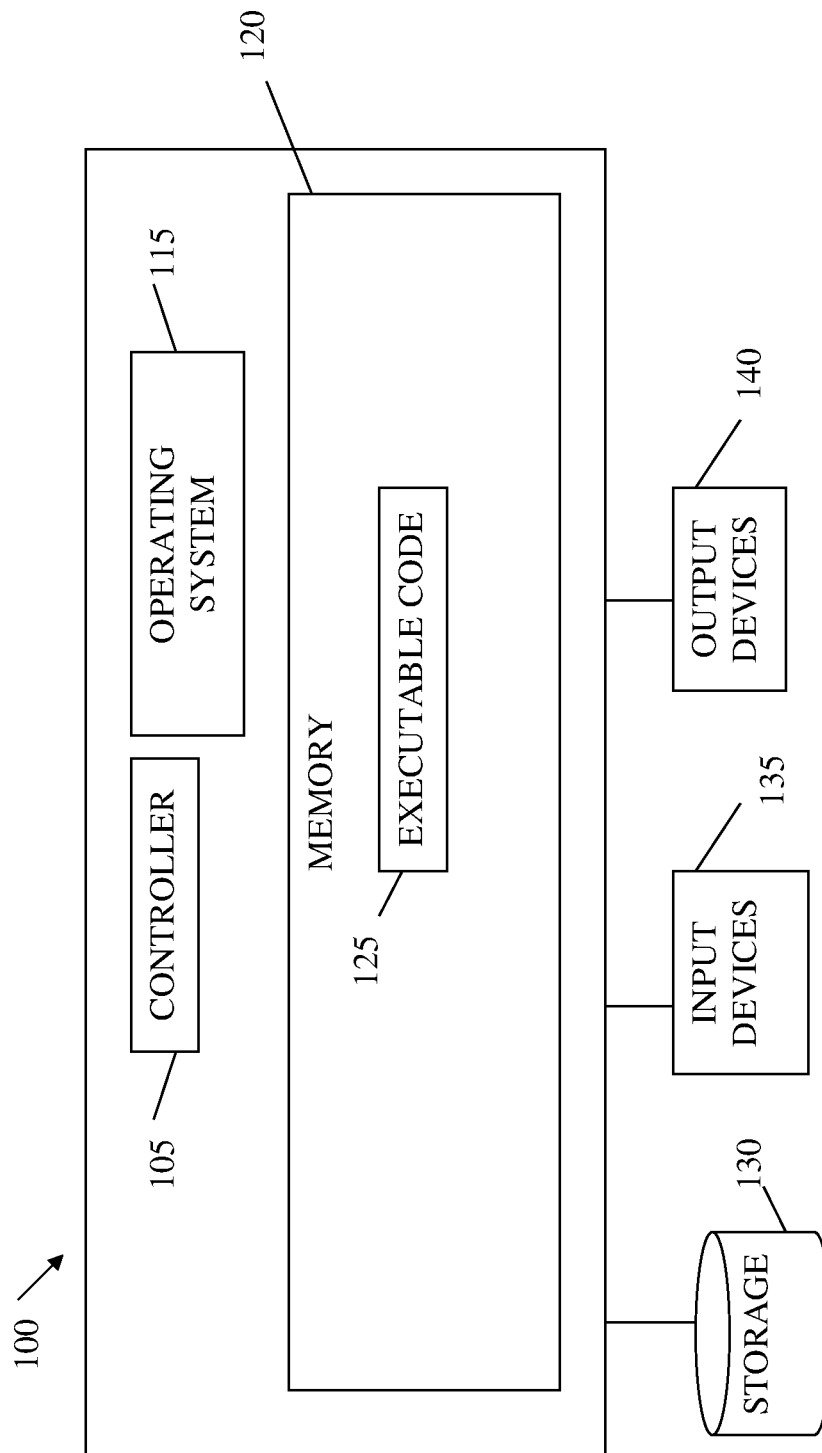
FIG. 6 shows a high-level block diagram of an exemplary computing device according to some embodiments of the present invention.

FIG. 3 depicts a system including a biometric comparison system according to embodiments of the present invention. Some of the various components of FIG. 3 may be separate computing devices such as servers and others may be combined into one computing device. Some modules in FIG. 3 may be included in other computing devices. The various computing devices and modules in FIG. 3 may be implemented as computer systems such as shown in FIG. 6. FIG. 3 depicts an example embodiment of a system processing biometric information, e.g. a call center using voice biometric information to authenticate customers: other embodiments may be used in other contexts, with biometric information other than voice biometric information. The system in FIG. 3 may be operated by an organization such as a call center, credit card company, financial institution, etc. Some of the functionality in FIG. 3 may be performed by a third-party system providing authentication, biometric, and other services.

A system 310 which may be for example a call center may include agent communications equipment 312 (e.g. an agent's station using agent software) connecting to external customer communication equipment 300 (e.g. conventional or cellular telephones, personal or laptop computers, or other devices). Users and agents may use equipment 300 and 312 to communicate with each other, typically by voice channel (e.g. telephone calls, or voice over IP (VOIP) conversations). A network 302 such as the Internet or a telephone system may connect user equipment 300 and system 310. Interactions center 355 (which may include other components in FIG. 3 such as recording functions) may manage the life-cycle and orchestration around interactions such as telephone calls, including for example control over recording, control of voice buffering (e.g. for real-time authentication (RTA)), saving of interaction metadata, etc.

System 310 may include a connect API system 315 which may connect an end-user system (such as agents at a call center) to a third party system providing services such as authentication or other call-center services, an end-user system database server 320 which may store customer information known by an end-user (e.g. information describing customer identification, account number, account information, etc.), and a distributed cache 325 which may store recently used information which is also stored in end-user system database server 320. System 310 may include an application server 330 which may input call or interaction data, determine which interactions need to be sent to enrollment, and process the data to produce data such as an interaction identification (ID) to be sent to enrollment and voice biometrics (VB) server 340 which may include a biometric engine 342 (biometric engine 342 may be on a separate computer or server from VB server 340; in general the components and functionality depicted does not need to be arranged on computer systems as depicted). Application server 330 may include an enrollment service, a rule engine for the voice biometrics enrollment which may decide which interactions should go to enrollment and which should not. The output of application server 330 may be a list of interactions that should be processed into VPs by enrollment and VB server 340.

Enrollment and VB server 340 may receive interaction metadata indicating interactions to enroll, and may access storage areas to access, from interaction or call data, actual voice data or recordings, and use this data to create VPs. Enrollment and VB server 340 may create enrollment data by providing call data (e.g. audio data) to biometric engine 342 which may create or compare voiceprints. Biometric engine 342 may use an X-dimensional vector space representation for human voice physical and environmental characteristics to create a VP, using for example machine learning to interpret meaning of the X dimensions.

One function of biometric engine 342 may be to generate a comparison score between an authentication biometric sample (e.g. taken from an interaction) and a stored enrollment biometric sample (e.g. a biometric sample created prior to an interaction where the identity of the person from whom the sample is taken is known or authenticated with some reasonable confidence). The score may be used as an authentication score. Biometric engine 342 may use an i-vector method, or a machine learning model such as a NN which has been trained, but may use other processes. A threshold or other parameters of biometric engine 342 may be adjusted or tuned by embodiments of the present invention. Enrollment and VB server 340 and/or biometric engine 342 may create a set of artificial or impostor scores, perform a Gaussian analysis, and/or adjust a biometrics system parameters or thresholds. In other embodiments, components other than biometric enrollment and VB server 340 and biometric engine 342 may perform such functions. While in the example embodiment depicted enrollment and VB server 340 and/or biometric engine 342 have certain functionality, this functionality may be performed by other modules, one combined module, etc.

Enrollment data may include two representations: an interactions-oriented representation may include metadata such as interaction ID, interaction start time, contact start time, enrollment Status, and customer ID, and may be stored in provider system database server 350 (e.g. operated by NICE Ltd.); and a customer oriented representation may include metadata such as: customer ID, number of enrollments, enrollment status, consent status, consent modify date, customer status, a list of identifiers, etc. and may be stored in end-user system database server 320.

Enrollment data created by enrollment and VB server 340 and biometric engine 342 may be sent to a provider system database server 350 (which may store for example enrollment and authentication biometric samples such as VPs). System 310 may include a storage area 345 which may store files of the call recordings along with call voice data, a recorder 360 which may save calls data to e.g. disk for short and long term (e.g. archiving), and manage such data (e.g. deletion) over time, and an interactive voice response (IVR) server 370 which may allow computers to interact with humans through the use of voice and DTMF tones input via a keypad, e.g. by prompting the caller to utter a phrase, capturing the voice data and sending it to enrollment and VB server 340 for voiceprint verification and creation. Data such as enrollment VPs 390, authentication VPs 392, and scores 394 (e.g. scores resulting from authentication, scores resulting from random parings, or combined sets of scores) may be stored in provider system database server 350. A specific table or database 396 may store authentication VPs and/or authentication scores or results. Other specific components may be used.

Voiceprints may be represented as for example i-vectors which may be stored as byte-arrays. Interactions or calls data may be stored as for example byte data in storage area 345. Interaction metadata may be stored as complex objects containing lists of information, such as different business data strings. Example interaction metadata includes interaction ID, local start time, local stop time. Greenwich Mean Time (GMT) start time. GMT stop time, interaction duration, open reason, close reason, switch ID, user ID, interaction type, media type, dialed number, participants, contact ID, contact start time, call ID, and/or possibly other information. User, client or customer metadata may be stored for example as a complex object. Example customer metadata includes customer ID, tenant ID (e.g. the ID of the particular organization owning the data, as multiple organizations may be associated with data on the same system), customer relationship management (CRM) reference, gender ID, first name, last name, address, birth date, seniority, nationality, state of origin, credit risk, marital status, and/or possibly other information.

Scores 394 resulting from random pairings (e.g. impostor scores) may be stored as numeric values in a data structure such as a table or dictionary. Alternatively, scores resulting from random pairings can be stored as a List as JSON structures or using a similar data structure. In one embodiment, once scores are produced from random pairings, the authentication biometric samples may be discarded, after which a system may begin storing newer authentication biometric samples again to create a "fresh" batch of the latest authentication biometric samples. Scores 394 may be but need not be linked to the authentication biometric samples which were used to produce them.

In use, a system such as FIG. 3 may accept a customer call or interaction to an agent (e.g. using equipment 300 and 312 to communicate with each other). Connect API system 315 may resolve the customer using, e.g. via distributed cache 325, which may synchronize with provider system database server 350. Resolving a customer may involve receiving a customer identifier (e.g. social security number, credit card number, account ID, etc.) and finding that customer's entity in the relevant repository. Resolving a customer may for example, identify if a customer has consented to voice biometrics or is enrolled already. An enrollment flow or process may begin, once the interaction or call has ended and was archived. Typically, once the call is over, if the customer has been manually authenticated, an enrollment process reads the customer's interaction information and updates enrollment and VB server 340 with the interaction details, and enrollment and VB server 340 fetches or receives the interaction from storage area 345. Enrollment and VB server 340 may play back the interaction audio from storage area 345 and may create a VP, using biometric engine 342, which may store the VP in provider system database server 350. The enrollment process may then update the customer's enrollment status via the distributed cache 325.

A customer that was previously enrolled may contact the organization operating the system of FIG. 3 by any of a number of channels (e.g. IVR, a cellular or other mobile app, a website, a VOIP service such as the WhatsApp service, a traditional telephone call, etc.) and begin an interaction. A web service (e.g. a service provided or exposed by connect API system 315) may receive interaction information (e.g. a "Get Context" process) relevant to the interaction. e.g. via connect API system 315 and interactions center 355. Interactions center 355 may instruct recorder 360 to start buffering or recording the audio from the interaction. At the same time, customer information describing the customer may be transmitted to connect API system 315, which may transmit the information to the interactions center 355. Interactions center 355 may resolve the customer for example via distributed cache 325. Interactions center 355 may send information about the customer (typically whether the customer has a voiceprint or not) to connect API system 315, which may send it to the agent communications equipment 312. An authentication request may cause recorder 360 to authenticate the customer: recorder 360 may transmit the authentication request with the buffered audio to the biometric engine 342. Biometric engine 342 may compare the voice print to the buffered audio, may create and save an authentication VP, and may return a result (e.g. authenticated, not authenticated, inconclusive; a result may include additional information such as a score and a reason for a score (e.g. not enough speech)). After this process, the biometric engine 342 may periodically execute a re-calibration algorithm.

Figure 2C:
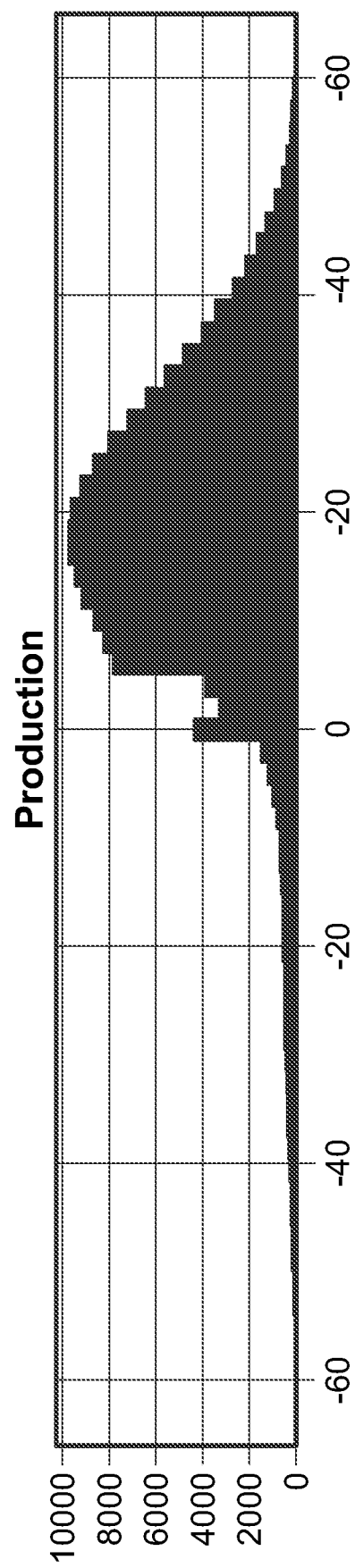
FIG. 2C depicts a data set resulting from mostly positive authentications, according to embodiments of the present invention.
Figure 4:
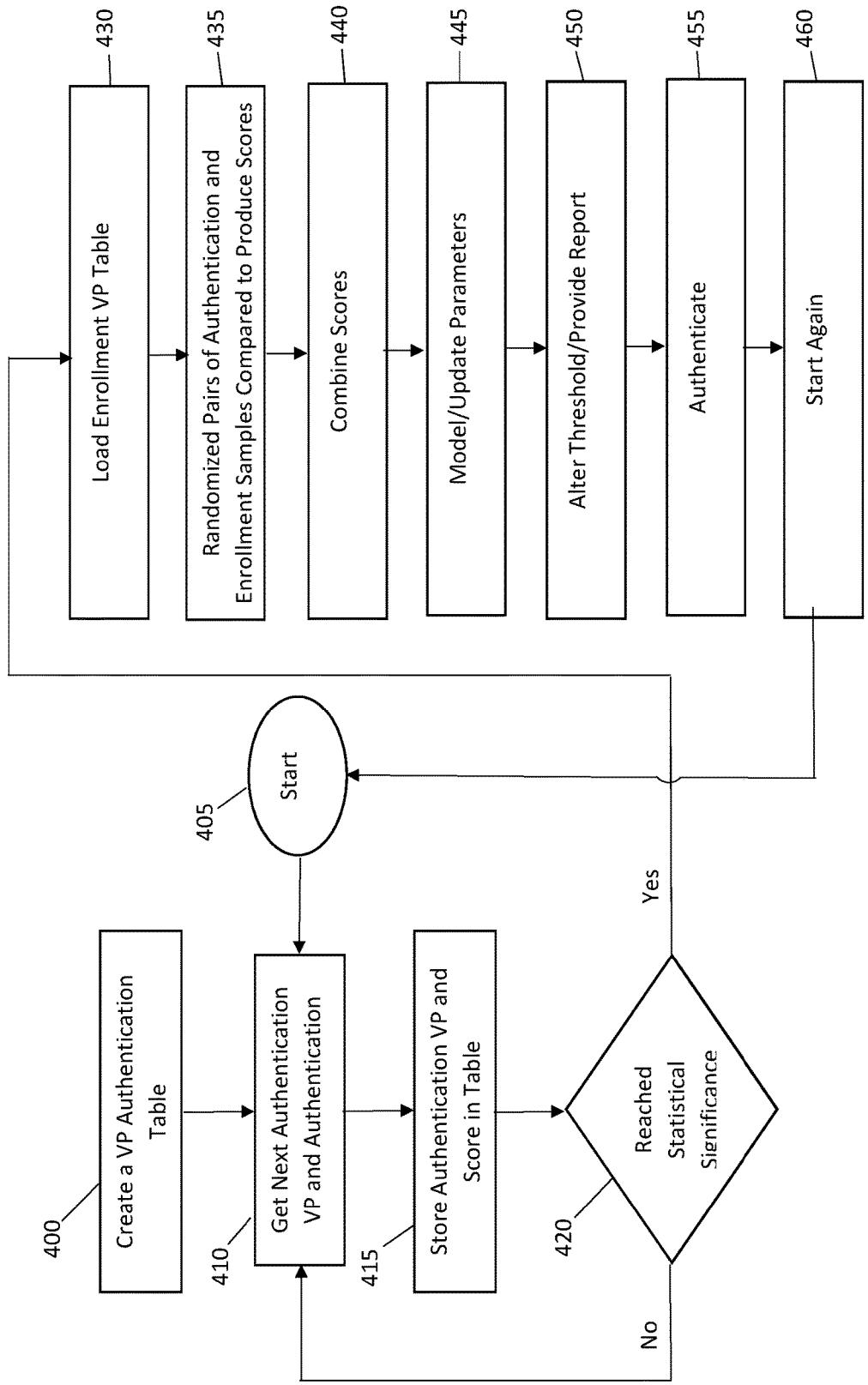
FIG. 4 shows a flowchart of a method according to embodiments of the present invention.

FIG. 4 shows a flowchart of a method according to embodiments of the present invention. The operations of FIG. 4 may use systems and data structures as shown in FIGS. 1-3, but may also use other formats of data and other systems. In some embodiments, operations in FIG. 4 may be performed by biometric enrollment and VB server 340 and biometric engine 342, but components other than biometric enrollment and VB server 340 and biometric engine 342 may perform such functions.

The process in FIG. 4 may be started periodically or for example when an automatic process or a person detects a decrease in system performance (e.g. an increase in false positives or false negatives). In operation 400 a data structure such as a VP authentication repository or table (e.g. table or database 396) may be created or initialized to store biometric authentication information, such as authentication VPs. Biometric information other than VPs may be used, such as face detection, iris detection, ear shape, fingerprint, etc.

In operation 405, a calibration process may start. During a series or iterations of biometric comparisons of authentication biometric samples (e.g. VPs) to enrollment biometric samples (e.g. VPs), authentication biometric samples may be collected or stored in the table, and scores resulting from the biometric comparisons may be collected or stored in the table as a first set of scores. However, a separate table holding authentication data need not be used. The calibration process may start and proceed automatically—e.g. without human intervention. In other embodiments, the calibration process may be initiated externally, e.g. by a person controlling the system noticing a loss in quality and requesting that an automatic process start. In such a case even if initiated by a human the process itself may be automatic. It may be considered that in some embodiments all operations in FIG. 4 may be performed automatically by a computer.

In operation 410, as part of a normal authentication process, a person may start to be authenticated (e.g. a person may call a call center and start an interaction, information from which may be used for authentication and produce a biometric sample). The biometric sample, e.g. an authentication VP, may be obtained. A result such as an authentication score, e.g. by comparing the authentication biometric sample to a collected or stored enrollment biometric sample which is assigned to the person purporting to have the identity of the provider of the authentication sample (e.g. the caller). e.g. using biometric engine 342, may be produced. The stored enrollment biometric sample may be assigned to a person with a certain identity which is confirmed to a certain extent at enrollment time, and when a person claiming to have that certain identity wishes to be authenticated, that identity is used to index or find the enrollment biometric sample to compare to the authentication biometric sample.

In operation 415, the biometric sample and result or authentication score produced by the authentication process may be collected or stored in the table, in order that the "genuine" authentication scores may be used.

In operation 420, it may be determined (e.g. automatically) if the number of samples has reached a threshold, for example a threshold of statistical significance. If the threshold has not been reached, the process may continue with operation 410, and if the threshold has been reached, the process may continue to operation 430. A measure of statistical significance may be for example the t-test method (using inferential statistical analysis), or the Chi test method (e.g. the chi-squared statistical hypothesis method). In other embodiments, collection of authentication data may move from collection to calibration without a threshold, such as by collecting samples over or during a set period of time (e.g. over the period of a week), or periodically.

Collecting samples may form a first stage of a process, and a second stage may include creating scores from the samples and generating a report or recalibrating the system.

In operation 430, enrollment biometric samples may be loaded, e.g. from provider system database server 350. In other embodiments, such samples may be already available. e.g. in a cache or memory. (In some embodiments loading need not be performed, if the data is already in place.)

In operation 435, a second set of biometric comparisons or results may be created, each comparison based on a pairing (e.g. randomized) of a collected or stored authentication voice print and an enrollment biometric voice print. Each such pairing and comparison may result in or produce an "impostor" score (e.g. a second set of scores). The scores may result from a comparison process similar to the process producing scores in operation 410, e.g. using biometric engine 342. However, the comparison in operation 435 is between an authentication biometric sample and an enrollment sample where the two are chosen randomly (or one is chosen randomly) such that it is likely that the person having produced the authentication sample is not the person associated with or having produced the enrollment sample, and thus the resulting score likely indicates a mismatch or non-authentication.

A process of random pairings may be iterated or repeated many times to generate a large number of samples, for example stopping or ending on statistical significance. Statistical significance may be determined using for example a t-test method or a Chi test method.

Certain biometric samples (enrollment and/or authentication) may be re-used and paired randomly more than once.

In operation 440, the different sets of results may be combined; e.g. the first set of authentication (e.g. genuine) scores may be combined with the second set of random-pairing or impostor scores may be combined to produce a third, combined set of scores or results.

In operation 445 the third combined set of scores or results may have performed on it a parameter or model update process. For example, an iterative process, or a modelling process, may be performed over the third set of scores to update the parameters of the distribution of the third set of scores which is modeled by a mixture of Gaussian distributions.

In operation 450, as a result of or following the parameter change, a report may be provided or displayed, and/or the threshold or settings for biometric authentication may be moved or changed (e.g. automatically). For example, once the Gaussian mixture model has been created or fixed, an automatic process can define or accept a desired FAR and FRR (where, typically one of the FAR or FRR if taken as a given is used to derive the other based on the data) and based on this extract or calculate the threshold needed to obtain this FAR and FRR. A display or report may for example the Gaussian distribution of the third set of scores, the Gaussian distributions of the first and second set of scores, thresholds, FAR or FRR data, or other data.

A report may include insights provided via a display or dashboard, showing, e.g. a false accept rate, a false reject rate, and a recommended threshold or other settings. A report may include information such as shown in FIG. 2 or FIG. 5.

Some of operations 430-450 may be performed in an automated manner in the background e.g. all the time or periodically, and may adjusts biometric threshold or accuracy in an autonomic manner. For example, creating a second set of biometric comparisons may be executed in background during the series of biometric comparisons of authentication voice prints to enrollment voice prints.

Figure 5:
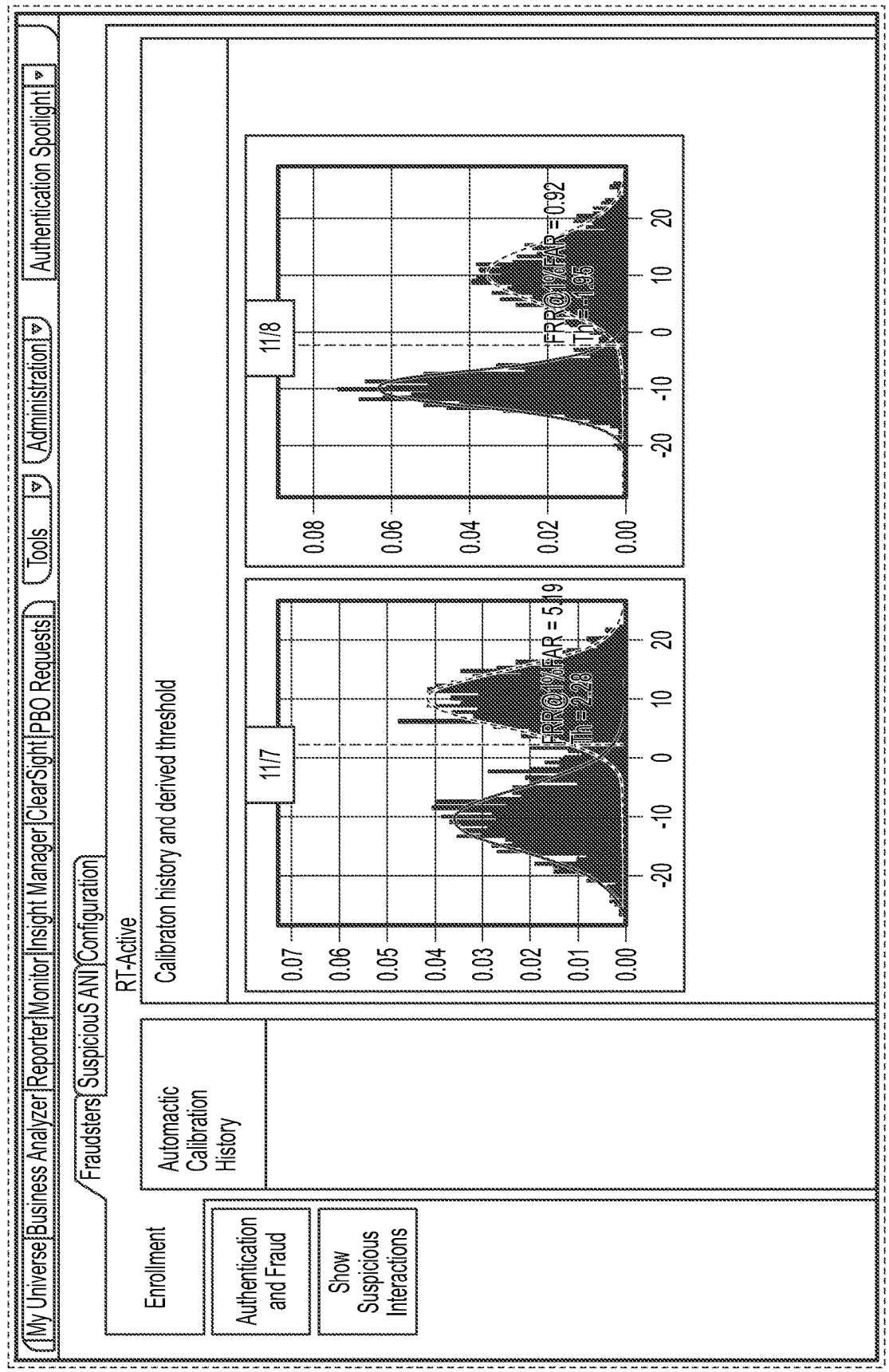
FIG. 5 depicts a sample user display according to embodiments of the present invention.

FIG. 5 depicts a sample user display according to embodiments of the present invention which may be displayed for example via a graphical user interface (GUI). FIG. 5 describes how a display provided to a user allows customers to monitor changes that made (e.g. automatically) by a system according to embodiments of the present invention. Users viewing a display such as in FIGS. 2 and 5 may have the ability to see the distributions and the threshold that is derived from them, and may be able to monitor such data, for example based on date. For example, given a 1% FAR which, based on a particular set of data, results in a calculation of a 0.92% FRR, the Gaussian distribution on the right-side graph in FIG. 5 may dictate a threshold of −0.1.95.

In operation 455 authentications may be performed using the new threshold created based on the updated parameters of the Gaussian distribution. Typically, the use of the new threshold may result in more accurate authentication, such as fewer false negatives (a person denied authentication who is who they purport to be) and fewer false positives (a person authenticated who is not who they purport to be); thus some embodiments may improve authentication technology. Operation 455 may be performed as part of operation 410.

In operation 460, periodically, automatically, or based on a user request, the adjustment process may be restarted at operation 405 (the authentication table may be re-initialized and old authentication data discarded).

Other or different operations may be performed.

Modelling or altering parameters may be performed based on an expectation-maximization algorithm, using a Gaussian mixture model combining two Gaussian distributions, or combining two data sets each having a Gaussian distribution. For the combined Gaussian distribution which includes both the authentication (e.g. genuine) scores and the random-pairing or impostor scores, parameters may be initialized which are typically changed over the course of the process. For example, two each of weight, variance (or in another embodiment standard deviation), and mean may be initialized, one weight, mean and variance for each of the two groups of Gaussian distributions (genuine and impostor distributions). In example FIG. 2A, two Gaussian distributions 202 and 204 each have one weight, mean and variance. For each data set or Gaussian distribution in the combined Gaussian distribution, an iterative process may be performed where the likelihood of every point—e.g. every score represented in each of the two original Gaussian distributions—falling within it may be calculated, and based on this resulting likelihood the weight, mean and variance may be updated. This iteration may be repeated until convergence takes place.

For each score in the combined data set or Gaussian distribution an automatic process may calculate a likelihood of belonging to a distribution. A process may calculate how likely it is for each score in a score vector $\underline{x}$ (the scores forming the combined data set or Gaussian distribution; the scores indexed by j) to belong to each of the two original Gaussian distributions (e.g. is likely to fit within the distribution), to produce for each score two likelihoods. These two likelihoods per score may be used to update the parameters for each of the two original Gaussian distributions (e.g. weight c, mean $\mu$ and variance $\Sigma$). Eq. 1 below may determine $\alpha_\ell^j$, the likelihood for point or score j to belong to Gaussian distribution $\ell$ normalized by sum of all such probabilities:

$$\alpha_\ell^j = \frac{p(x_j \mid i_j = \ell, \underline{\theta}')c'_\ell}{\sum_{\ell=1}^{M} p(x_j \mid i_j = \ell, \underline{\theta}')c'_\ell} = \frac{N(x_j; \underline{\mu}'_\ell, \sum'_\ell)c'_\ell}{\sum_{\ell=1}^{M} N(x_j; \underline{\mu}'_\ell, \sum'_\ell)c'_\ell} \quad \text{Eq. 1}$$

where j represents a specific score or point, p is probability, $c'_\ell$ is the weight for a specific score for Gaussian distribution $\ell$, $\mu'_\ell$ is mean for a specific score for Gaussian distribution $\ell$ and $\Sigma\mu'_\ell$ is variance for Gaussian distribution $\ell$, a 'as a superscript (e.g. $\Sigma\mu'_\ell$) indicates that term for a specific or new score, the term i is an indicator to represent that p is the probability of the occurrence of $x_j$ (x sub j) within score vector $\underline{x}$ 'given that point or score indexed by j belongs to the Gaussian distribution $\ell$, given $\theta'$ (theta, representing all the means and variances of all the Gaussian distributions). Since all that are needed are parameters associated to Gaussian $\ell$, probability p may become $N(\underline{x}_j; \underline{\mu}'_\ell, \Sigma'_\ell)$ which represents the probability of xj to belong to Gaussian distribution $\ell$, that has $\mu'$ (mu') $\ell$ and $\Sigma'$ (sigma') $\ell$.

Eq. 1 may be part of an expectation (E) step, which may create a function for the expectation of the log-likelihood evaluated using the current estimate for the parameters. The likelihood $\alpha$ may be used to calculate new weights, means and variances in a maximization (M) step. One likelihood may be calculated for each data point (e.g. score) for each of the two Gaussian distributions, and after an "epoch" where all such points have likelihoods calculated, the set of likelihoods may be used to calculate new parameters (e.g. weight, mean and variance (or in some embodiments standard deviation)), using for example equations 2-6, and which may be used for the next probability determination (e.g. Eq. 1) for the same set of data points over the next epoch. An epoch may be an iteration where all scores or data points have likelihoods calculated. Iterating may be stopped for example if convergence occurs, e.g. as calculated by example equation 7. Typically, likelihoods are calculated for all scores, and after that parameters are updated, and after that, if it is determined another iteration is to be performed, another "epoch" is performed where likelihoods are calculated using the updated parameters. Organizing iterations to epochs need not be used.

After an epoch or iteration step, new weights may be calculated using example equations Eq. 2 and Eq. 3 as follows:

$$\hat{c}_\ell = \frac{\alpha_\ell}{N} = \frac{\alpha_\ell}{\sum_j \alpha_j} \quad \text{Eq. 2}$$

Where in Eq. 2 for N scores (N being an integer indicated the number of points or scores):

$$\left(\sum_{j=1}^{N} \alpha_\ell^j\right) \triangleq \alpha_\ell \quad \text{Eq. 3}$$

A caret (ˆ, also termed a hat) above a term (e.g. c) indicates an iterative process across all points or scores (e.g. new values get a caret, and old do not, but in every iteration the values that had a caret become caret-less and the new ones get a caret and so on.). ≜ indicates an equivalence.

New means may be calculated using example equation Eq. 4 as follows:

$$\hat{\underline{\mu}}_\ell = \frac{\sum_{j=1}^{N} \alpha_\ell^j \underline{x}_j}{\sum_{j=1}^{N} \alpha_\ell^j} \quad \text{Eq. 4}$$

Where $\hat{\underline{\mu}}_\ell$ is a vector of weights for a Guassian distribution $\ell$, the caret indicates it is for $\hat{\underline{\mu}}_\ell$ a certain iteration, and the underline indicates that mu is a vector of weights. Multiplying likelihood alpha by the vector $\underline{x}$ indicates a type of weighted average.

New variances may be calculated using example equations Eq. 5 and Eq. 6 as follows, where Γ (gamma) is a temporary variable used for simplicity, and T indicates the transpose of the relevant vector:

$$\Gamma_\ell \triangleq \sum_{j=1}^N \alpha_\ell^j x_j x_j^T$$

$$\hat{\Sigma}_\ell = \frac{\Gamma_\ell}{\alpha_\ell} - \mu_\ell \mu_\ell^T$$

Eqs. 5 and 6

Means and variances are typically scalars. Equations 1-6 are used iteratively until convergence occurs, for example until the mean stops changing after each iteration, or where the change of the mean after each iteration slows to a predetermined rate. Parameters other than mean may be used to determine convergence; e.g. variance may be used. Convergence may be defined as, for example:

abs(current mean−new mean)<0.0000001(for all means)   Eq. 7

Where, for the mean for each of the two Gaussian distributions, the difference between two iterations is less than the example threshold 0.0000001. Other metrics of convergence or "steady state", or tests for stopping may be used. Using such a process Gaussian parameters may be transformed such that, for one example, an initial set of parameters defining the two Gaussian distributions in FIG. 2A may be transformed to parameters for the two Gaussian distributions in FIG. 2B.

Reference is made to FIG. 6, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 3 may be or include devices such as computing device 100, and one or more devices such as computing device 100 may carry out functions such as those described in FIG. 4. For example, enrollment and VB server 340 and/or biometric engine 342 may be implemented on or executed by a computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to perform biometric comparison or authentication, to handle or record interactions or calls, to act as a biometric comparison system, to analyze or adjust biometric system parameters or thresholds, and perform other methods as described herein. Although, for the sake of clarity, a single item of executable code 125 is shown in FIG. 6, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as interactions, metadata, biometric system samples, parameters or thresholds may be stored in storage system 130 and may be loaded from storage system 130 into memory 120 where it may be processed by controller 105. Some of the components shown in FIG. 2 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Some embodiments may use a neural network (NN) (e.g. as part of biometric engine 342) and thus the system of FIG. 6 may function as a NN. A NN may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for adjusting the threshold in a biometric comparison system, the method comprising:
over a series of biometric comparisons of authentication voice prints to enrollment voice prints, storing the authentication voice prints, and storing a plurality of scores resulting from the biometric comparisons in a first set of a plurality of scores;
creating a second set of biometric comparisons each based on a pairing of a stored authentication voice print and an enrollment voice print, each biometric comparison resulting in a score, the plurality of resulting scores forming a second set of a plurality of scores;
wherein the pairing of the stored authentication voice print and the enrollment voice print is a random pairing;
merging the first set of a plurality of scores with the second set of a plurality of scores to produce a third set of a plurality of scores, the third set of a plurality of scores comprising a plurality of discrete values, each discrete value taken from one of the first set of scores and the second set of scores; and
performing an iterative process over the third set of scores to update the parameters of the Gaussian distribution of the third set of scores.

2. The method of claim 1, wherein the series of biometric comparisons occurs during authentication processes.

3. The method of claim 1, wherein each of the stored voice prints used for the biometric comparisons results in a score being stored, resulting from the biometric comparisons, in a first set of scores.

4. The method of claim 1, comprising creating an authentication threshold based on the updated parameters of the Gaussian distribution of the third set of scores.

5. The method of claim 1, wherein the parameters of the Gaussian distribution comprise a weight, mean and variance.

6. The method of claim 1, wherein the iterative process comprises an expectation-maximization algorithm.

7. The method of claim 1, comprising performing an authentication using a threshold based on the updated parameters of the Gaussian distribution.

8. The method of claim 1, comprising displaying the Gaussian distribution of the third set of scores.

9. The method of claim 1, wherein creating a second set of biometric comparisons is executed in background during the series of biometric comparisons of authentication voice prints to enrollment voice prints.

10. A system for adjusting the threshold in a biometric comparison system, the system comprising:
a memory, and
a processor configured to:
over a series of biometric comparisons of authentication voice prints to enrollment voice prints, store the authentication voice prints, and store a plurality of scores resulting from the biometric comparisons in a first set of a plurality of scores;
create a second set of biometric comparisons each based on a pairing of a stored authentication voice print and an enrollment voice print, each biometric comparison resulting in a score, the plurality of resulting scores forming a second set of a plurality of scores;
wherein the pairing of the stored authentication voice print and the enrollment voice print is a random pairing;
merge the first set of a plurality of scores with the second set of a plurality of scores to produce a third set of a plurality of scores, the third set of a plurality of scores comprising a plurality of discrete values, each discrete value taken from one of the first set of scores and the second set of scores; and
perform an iterative process over the third set of scores to update the parameters of the Gaussian distribution of the third set of scores.

11. The system of claim 10, herein the series of biometric comparisons occurs during authentication processes.

12. The system of claim 10, wherein each of the stored voice prints used for the biometric comparisons results in a score being stored, resulting from the biometric comparisons, in a first set of scores.

13. The system of claim 10, wherein the processor is configured to create an authentication threshold based on the updated parameters of the Gaussian distribution of the third set of scores.

14. The system of claim 10, wherein the parameters of the Gaussian distribution comprise a weight, mean and variance.

15. The system of claim 10, wherein the iterative process comprises an expectation-maximization algorithm.

16. The system of claim 10, wherein the processor is configured to perform an authentication using a threshold based on the updated parameters of the Gaussian distribution.

17. A method for adjusting the threshold in a biometric voiceprint comparison system, the method comprising:
- collecting the results of comparisons of authentication voice prints to enrollment voice prints, and collecting the authentication voice prints;
- collecting a plurality of results of a set of biometric comparisons each of the plurality of results based on a pairing of an authentication voice print and an enrollment voice print;
- merging a plurality of results of comparisons of authentication voice prints to enrollment voice prints and a plurality of results of a set of biometric comparisons each based on a pairing of an authentication voice print and an enrollment voice print to produce a set of results, wherein the pairing of the stored authentication voice print and the enrollment voice print is a random pairing, the produced set of results comprising a plurality of discrete values, each discrete value taken from one of: the plurality of results of comparisons of authentication voice prints to enrollment voice prints; and the plurality of results of a set of biometric comparisons; and
- performing an iterative process over the set of results to update the parameters of the Gaussian distribution of the third set of scores.

18. The method of claim 9, comprising displaying the Gaussian distribution of the set of results.

\* \* \* \* \*